Nov. 14, 1944.   W. DE C. CRATER   2,362,743
MANUFACTURE OF DINITROTOLUENE
Filed Feb. 10, 1943
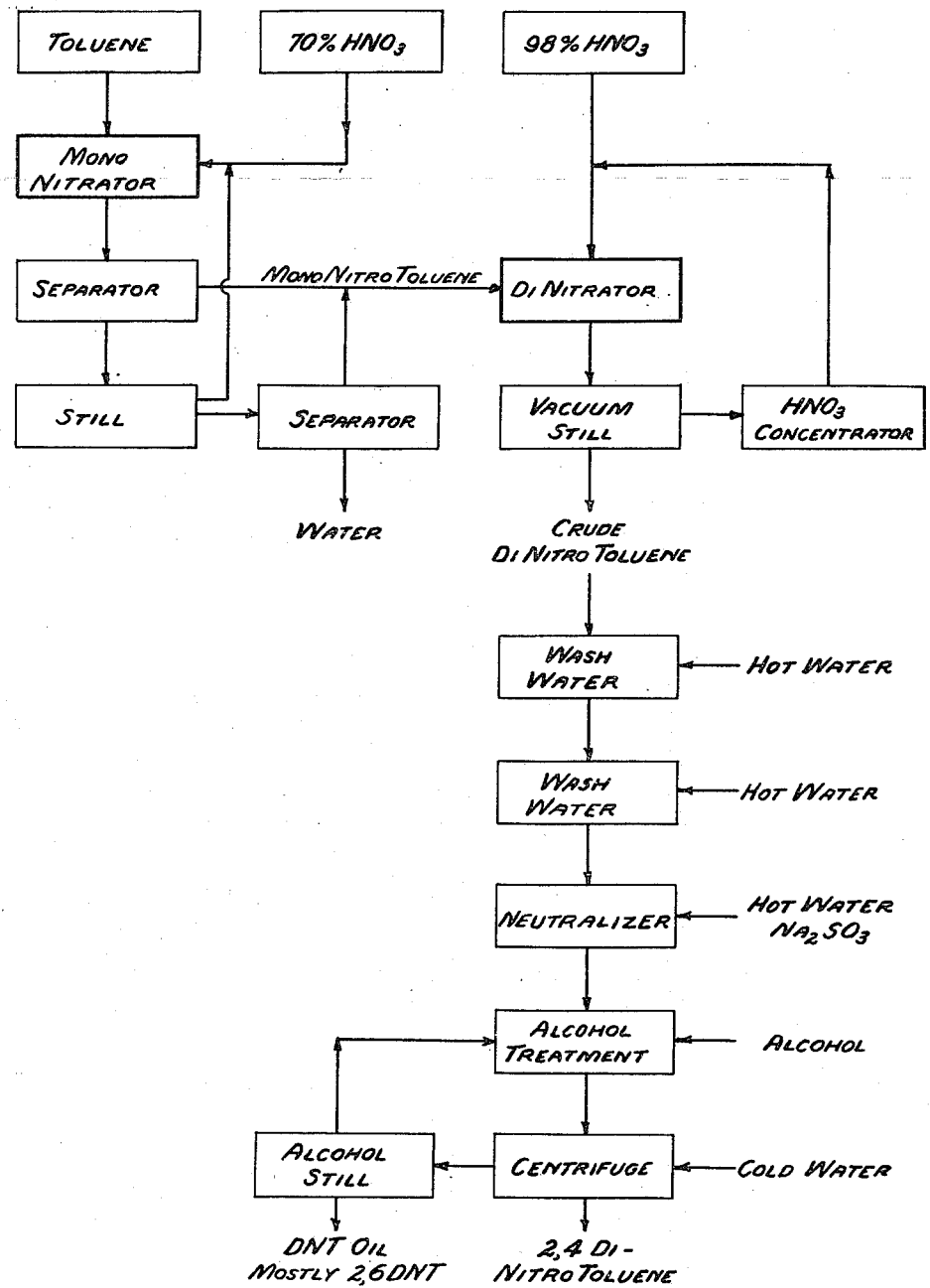
INVENTOR.
Willard deC. Crater
BY
*Cleveland B. Hollabaugh*
ATTORNEY Patented Nov. 14, 1944

2,362,743

UNITED STATES PATENT OFFICE 2,362,743

MANUFACTURE OF DINITROTOLUENE

Willard de C. Crater, Newark, Del., assignor to Hercules Powder Company, Wilmington, Del., a corporation of Delaware Application February 10, 1943, Serial No. 475,373

7 Claims. (Cl. 260—645)

This invention relates to a process for the manufacture of dinitrotoluene and more particularly to a process for the manufacture, separation and stabilization of 2,4-dinitrotoluene.

Dinitrotoluene has been produced in the past by the use of a mixture of nitric and sulfuric acids. The nitration proceeds by first producing mononitrotoluene and then further nitrating to dinitrotoluene. The process requires considerable sulfuric acid which does not enter into the reaction and which requires the separation and reconcentration of the sulfuric acid for further use. Attempts have been made to nitrate toluene by the use of nitric acid alone, but this method has led to the formation of the mononitrotoluene without producing any dinitrotoluene.

Now in accordance with the present invention, dinitrotoluene and particularly 2,4-dinitrotoluene has been produced by the nitration of toluene with a nitric acid of about a 70% concentration to produce mononitrotoluene, followed by a further nitration with a nitric acid of about a 98% concentration to produce a crude dinitrotoluene. The crude dinitrotoluene is then subjected to several steps of washing, neutralizing, alcohol treatment, and centrifuging to obtain the 2,4-dinitrotoluene.

Having now indicated in a general way the nature and purpose of the invention, there follows a more detailed description of the preferred embodiments thereof with reference to the accompanying flow sheet in which the process is set forth in steps.

From this flow sheet, it will be seen that toluene is first nitrated with 70% nitric acid. The mononitrotoluene and the acid are then separated, the mononitrotoluene passed to the dinitrator and the residual acid passed to a still from which the approximately 70% nitric acid is returned to the acid supply, and the residue passed to a separator wherein the water is separated from any mononitrotoluene which may not have separated in the first separation step.

The 98% nitric acid is added to the mononitrotoluene in the dinitrator where the crude dinitrotoluene is formed. The mixture including the nitric acid is passed to a vacuum still where the nitric acid is separated from the dinitrotoluene. The nitric acid from the still is concentrated and returned to the 98% nitric acid supply.

The crude dinitrotoluene is then subjected to two steps of washing in hot water, is neutralized in a sodium sulfite solution, and is subjected to an alcohol treatment whereby crystals of 2,4-dinitrotoluene are separated out. These crystals are then separated by a centrifuge. The remaining alcohol is passed to a still where the alcohol is separated for re-use, and the dinitrotoluene oil is obtained which comprises mostly 2,6-dinitrotoluene.

More specifically, the invention may be carried out as follows: 70% nitric acid is charged into the mononitrator using approximately 3½ mols of nitric acid per mol of toluene. The toluene is then gradually added with good agitation and the temperature is allowed to rise to 75–80° C. where it is held for about 2 hours after the toluene has been added. The charge is then run into the separator, and the waste acid separated from the mononitrotoluene which is then drawn into a storage tank. This waste acid of about 50% concentration is run into a still, and the excess water, that is, above the constant boiling range, is removed by distillation. Mononitrotoluene present in this acid steam distills off with the water which is run into the separator where the water and mononitrotoluene are separated, the nitrotoluene being run into the storage tank, and the water to waste. The constant boiling nitric acid is returned to the mononitrator.

The mononitrotoluene is nitrated to dinitrotoluene with 98% nitric acid. In effecting the dinitration step, the mononitrotoluene may be added to the 98% nitric acid or vice versa. About 3 mols of 98% nitric acid are used per mol of mononitrotoluene. The temperature of nitration is allowed to rise to 80° C. where it is held for 2 hours after the addition has been completed.

After the nitration is completed, the charge is run into a vacuum still, and the nitric acid is distilled off, leaving the crude dinitrotoluene to be further purified and stabilized. The nitric acid distilled off is run into a concentrating still where a strong cut is taken off and returned to the dinitrator. Weak acid having a concentration of about 70 to 75% is returned to the mononitrator.

The crude dinitrotoluene is stabilized by giving it two fresh water washes at a temperature of about 140° F. A volume of water equal to the volume of charge is used for each wash, and washing is accomplished by vigorously agitating with air. Final stabilization is brought about by washing with a solution of sodium sulfite using about 15 parts per million in a volume of water equal to the volume of the charge at 140° F.

The wash waters are collected in a suitable catch box where they are allowed to stand and on cooling yield an appreciable amount of dinitrotoluene which is crystallized out and added to subsequent charges. After the charge has been stabilized, the molten dinitrotoluene is run directly into an equal or greater amount of cold alcohol at about 20° F. By this treatment, the 2,4-isomer crystallizes out and the 2,6-isomer and other isomers remain in solution in the alcohol. This alcohol slurry is run through a centrifuge or filtered and the liquid phase removed. After the liquid is removed, the solid material is rinsed with about 2/3 its weight in alcohol and wrung as dry as possible. After the final alcohol wash, the charge is rinsed by spraying with water in the centrifuge to remove the last traces of alcohol, after which it is dried.

The alcoholic solution of dinitrotoluene is placed in a still, and the alcohol distilled off leaving the low melting isomers of dinitrotoluene which are drawn off and which may be used as such or for the manufacture of trinitrotoluene.

The following is an example of a specific embodiment of the invention:

Three hundred parts by weight of toluene were added to 1035 parts of 70% nitric acid maintaining the temperature at 75–80° C. Then agitation was continued for 2 hours holding the temperature at 80° C. The charge was then separated due to difference in gravity and the mononitrotoluene added to 630 parts of 98% nitric acid at 75 to 80° C. The charge was then placed in a vacuum still and the nitric acid distilled off leaving the dinitrotoluene. The molten dinitrotoluene was then agitated with an equal volume of water at 140° F., two washes being given. To complete final neutralization, the charge was washed at 140° F. with an equal volume of water containing 15 parts of sodium sulfite.

The molten dinitrotoluene was then run into approximately an equal weight of alcohol, cooled to 20° F., which crystallizes the 2,4-isomers in solution. This slurry was then run into the centrifuge and the liquid phase was removed by wringing. After the liquid had been removed, the solid material was again agitated with about 2/3 its weight of alcohol, wrung as dry as possible and then rinsed by spraying with water to remove the last traces of alcohol after which the crystalline product was dried.

The alcohol-dinitrotoluene solution was placed in a still, and the alcohol distilled off for reuse, and the 2,6- and other isomers of dinitrotoluene recovered for subsequent nitration or use.

While the discussion and example specify 70 and 98% concentrations of nitric acid, some variation of these concentrations is possible. Thus, instead of the 70% nitric acid, a concentration within the range of from about 60% to about 75% could be used and in place of the 98% nitric acid a concentration in the range of from about 90% to about 100% can be used.

Thus, the present invention has described a process for the manufacture of dinitrotoluene and particularly of 2,4-dinitrotoluene by a process in which no sulfuric acid is used. The products may be used per se in explosives or may be nitrated further to trinitrotoluene.

What I claim and desire to protect by Letters Patent is:

1. A process for the manufacture of dinitrotoluene without the use of sulfuric acid which comprises the nitration of toluene to mononitrotoluene by the use of nitric acid having a concentration from about 60% to about 75%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration from about 90% to about 100%, the mol ratio of mononitrotoluene to the nitric acid being about 1 to about 3, and the temperature being maintained in the range of about 75° C. to about 80° C.

2. A process for the manufacture of 2,4-dinitrotoluene without the use of sulfuric acid which comprises the nitration of toluene to mononitrotoluene by the use of nitric acid having a concentration from about 60% to about 75%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration from about 90% to about 100%, the mol ratio of mononitrotoluene to the nitric acid being about 1 to about 3, and the temperature being maintained in the range of about 75° C. to about 80° C.

3. A process for the manufacture of 2,4-dinitrotoluene without the use of sulfuric acid which comprises nitrating toluene to mononitrotoluene with nitric acid having a concentration from about 60% to about 75%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration from about 90% to about 100%, the mol ratio of mononitrotoluene to the nitric acid being about 1 to about 3, and the temperature being maintained in the range of about 75° C. to about 80° C., washing the dinitrotoluene, dissolving the dinitrotoluene in alcohol, cooling the resulting solution, and separating out the crystals of 2,4-dinitrotoluene thus formed.

4. A process for the manufacture of dinitrotoluene without the use of sulfuric acid which comprises the nitration of toluene to mononitrotoluene by the use of nitric acid having a concentration of about 70%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration of about 98%, the mol ratio of mononitrotoluene to the nitric acid being about 1 to about 3, and the temperature being maintained in the range of about 75° C. to about 80° C.

5. A process for the manufacture of 2,4-dinitrotoluene without the use of sulfuric acid which comprises the nitration of toluene to mononitrotoluene by the use of nitric acid having a concentration of about 70%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration of about 98%, the mol ratio of mononitrotoluene to the nitric acid being about 1 to about 3, and the temperature being maintained in the range of about 75° C. to about 80° C.

6. A process for the manufacture of 2,4-dinitrotoluene without the use of sulfuric acid which comprises nitrating toluene to mononitrotoluene with nitric acid having a concentration of about 70%, the mol ratio of toluene to the nitric acid being about 1 to about 3.5, and the temperature being maintained in the range of about 75° C. to about 80° C., and subsequently nitrating to the dinitrotoluene by the use of nitric acid having a concentration of about 98%, the mol ratio of mononitrotoluene to the nitric acid being about 1 to about 3, and the temperature being maintained in the range of about 75° C. to about 80° C., washing the dinitrotoluene, dissolving the dinitrotoluene in alcohol, cooling the resulting solution, and separating out the crystals of 2,4-dinitrotoluene thus formed.

7. A process for the manufacture of 2,4-dinitrotoluene without the use of sulfuric acid which comprises nitrating toluene to mononitrotoluene with nitric acid having a concentration of about 70%, the mol ratio of toluene to the nitric acid being about 1 to about 3.5, and the temperature being maintained in the range of about 75° C. to about 80° C.; separating and recovering the nitric acid; nitrating the mononitrotoluene to dinitrotoluene by the use of nitric acid having a concentration of about 98%, the mol ratio of mononitrotoluene to the nitric acid being about 1 to about 3, and the temperature being maintained in the range of about 75° C. to about 80° C.; distilling off and recovering the nitric acid; washing the dinitrotoluene with hot water, neutralizing it with sodium sulfite solution, dissolving the dinitrotoluene in alcohol, cooling the resulting solution, and separating the crystals of 2,4-dinitrotoluene thus formed from the cold alcohol solution.

WILLARD DE C. CRATER.